United States Patent
Whitney et al.

(10) Patent No.: US 9,472,120 B1
(45) Date of Patent: Oct. 18, 2016

(54) SQUARE WHEEL TRICYCLE

(75) Inventors: Glen T Whitney, Stony Brook, NY (US); George Hart, Stony Brook, NY (US); Cindy Lawrence, Port Jefferson Station, NY (US); Timothy Nissen, New York, NY (US); Chenteh Kenneth Fan, Cambridge, MA (US)

(73) Assignee: Museum of Mathematics, St. James, NY (US)

(*) Notice: Subject to any disclaimer, the term of this patent is extended or adjusted under 35 U.S.C. 154(b) by 1473 days.

(21) Appl. No.: 12/796,869

(22) Filed: Jun. 9, 2010

(51) Int. Cl.
*G09B 23/02* (2006.01)
*A63G 1/22* (2006.01)
*B62K 9/02* (2006.01)

(52) U.S. Cl.
CPC ............... *G09B 23/02* (2013.01); *B62K 9/02* (2013.01)

(58) Field of Classification Search
CPC ........ G09B 9/00; G09B 25/00; G09B 23/00; G09B 23/02; A63H 17/14; A63H 17/18; A63G 1/22; B62M 1/00; B62K 5/02; B62K 9/02
USPC ........ 434/373, 188, 211; 446/433, 437, 440, 446/444; 472/21, 85
See application file for complete search history.

(56) References Cited

U.S. PATENT DOCUMENTS

| | | | | |
|---|---|---|---|---|
| 589,408 A * | 9/1897 | Brannan | .................. | A63G 1/22 472/21 |
| 605,629 A * | 6/1898 | Brannan | .................. | A63G 1/22 472/21 |
| 1,108,725 A * | 8/1914 | Duncan | .................... | A63H 1/04 446/258 |
| 1,261,197 A * | 4/1918 | Waterman | ................ | A63G 1/22 472/21 |
| 2,539,161 A * | 1/1951 | Rahning | .................. | A63G 1/22 472/21 |
| 2,687,897 A * | 8/1954 | Wells | ..................... | B62M 11/02 280/260 |
| 2,786,540 A * | 3/1957 | Sfredda | ................ | B62D 57/022 180/24.08 |
| 2,995,368 A * | 8/1961 | Moorhead | .............. | A63G 19/02 280/1.182 |
| 3,192,663 A * | 7/1965 | Kirschner | ............. | A63H 15/00 446/168 |
| 4,168,846 A * | 9/1979 | Carren | .................... | B62K 5/02 280/278 |
| 4,484,649 A * | 11/1984 | Kennedy | .................. | B62K 9/00 180/206.5 |
| 5,188,567 A * | 2/1993 | Volkov | .................... | A63K 1/00 472/85 |
| 6,328,500 B1 * | 12/2001 | Rubio | .................... | A63C 19/00 104/55 |

FOREIGN PATENT DOCUMENTS

RU          2009943 C1 *   3/1994

OTHER PUBLICATIONS

Ivar Peterson, "Riding on Square Wheels" Apr. 5, 2004, MAA Mathematical Association of America, pp. 1-3. <http://www.maa.org/mathland/mathtrek_04_05_04.html.*
Ivars Peterson, "Riding on Square Wheels" Apr. 5, 2004, MAA Mathematical Association of America, pp. 1-3, <http://www.maa.org/mathland/mathtrek_04_05_04.html.*
Mathematics Magazine, "Roads and Wheels", Leon Hall and Stan Wagon, 1992, Mathematical Association of America, 2 pp., www.jstor.org/pss/2691240.
Stan Wagon website, www.stanwagon.com, 2 pp. 2004.

* cited by examiner

*Primary Examiner* — Gene Kim
*Assistant Examiner* — Alyssa Hylinski
(74) *Attorney, Agent, or Firm* — Withrow & Terranova, PLLC

(57) ABSTRACT

An exhibit to assist in teaching mathematical properties to individuals may include a tricycle with square wheels. The tricycle may be mounted on a circular track with arcuate segments that effectively smooth out the motion imparted by the square wheels.

15 Claims, 8 Drawing Sheets

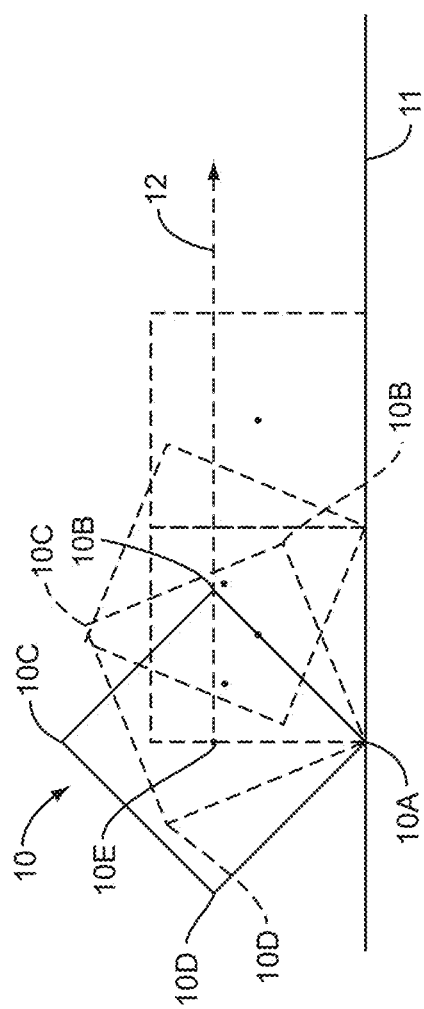
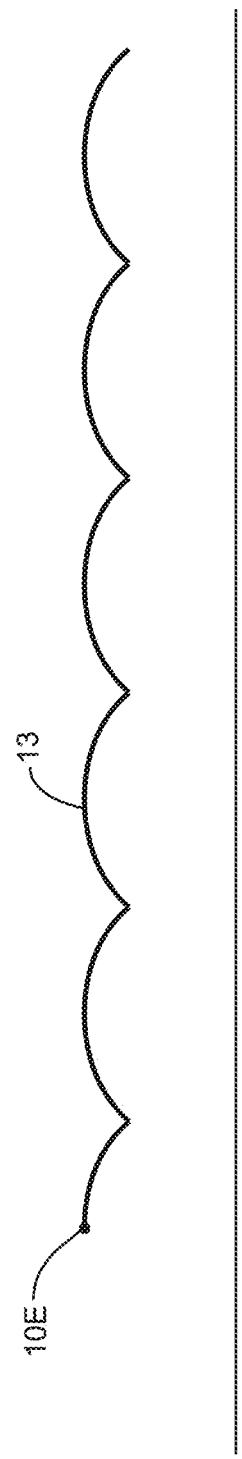
FIG. 1A
FIG. 1B

SQUARE WHEEL TRICYCLE

FIELD OF THE DISCLOSURE

The present disclosure relates to a tricycle used to demonstrate mathematical properties and particularly to a square wheeled tricycle.

BRIEF DESCRIPTION OF THE DRAWINGS

FIG. 1A illustrates the motion of a square wheel.

FIG. 1B illustrates the motion of a center point of the square wheel of FIG. 1A.

DETAILED DESCRIPTION

Figure 2:
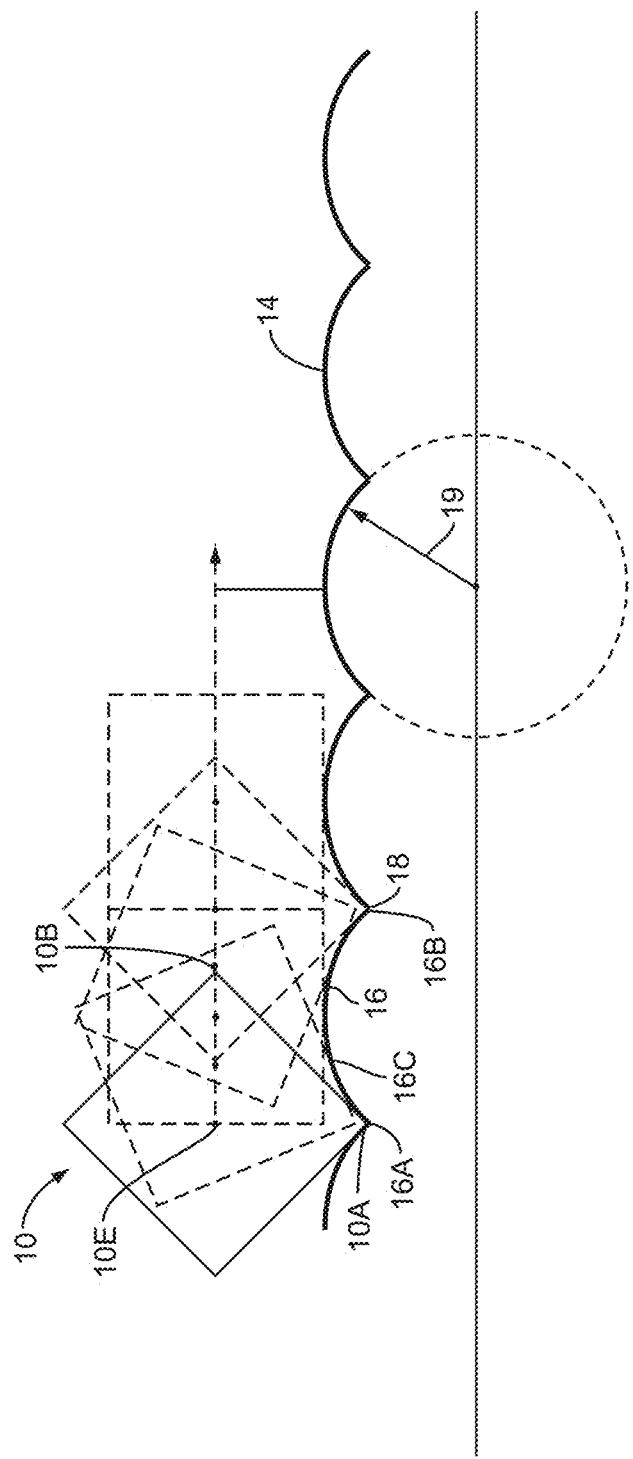
FIG. 2 illustrates the motion of a center point of a square wheel wherein the center point stays at a predetermined level.

Mathematics is often underappreciated for its ubiquity, beauty, and capacity to entertain, especially amongst children. By demonstrating mathematics in an entertaining manner, a greater understanding and a greater appreciation of the field may occur. The present disclosure provides a system suitable for use as an exhibit that demonstrates mathematical properties of objects in motion and particularly demonstrates the unlikely situation where an individual may ride a tricycle with square wheels relatively smoothly without the expected bumps and lurches as the square wheels rotate. The exhibit shows that mathematics can be applied to many fields, including recreation. It creates an association between mathematics and fun. It also shows how mathematics connects many fields, because the shape of the arches in the base is a catenary curve, which is the same shape (but upside down) of a length of chain when held at two locations. Furthermore, it illustrates how the circumference grows linearly with radius, because the wheels which are further from the center of the base need to be proportionally larger. Before addressing the particulars of the system, a brief overview of square wheel motion is provided with reference to FIGS. 1A and 1B.

In general, if a square wheel 10 is rotated along a straight surface 11 in a direction 12, the corners 10A, 10B, 10C, and 10D sequentially strike the surface 11 as is well understood. The center point 10E traces out a periodic arcuate path 13 as illustrated in FIG. 1B. If an interested party were to try to ride a bicycle or tricycle with square wheels, the arcuate movement of the center point 10E would be conveyed through the frame of the bike to the rider, making a bumpy ride.

In contrast, if the square wheel 10 is placed on a path 14 having arcuate humps 16 and troughs 18, the arcuate motion of the center point 10E may be smoothed out, especially if the arcuate length of the humps 16 corresponds to the length of a side of the square 10. That is, the path 14 may be designed such that the length of the side of the wheel 10 between corners 10A and 10B equals the length 16C (the distance between points 16A and 16B or successive troughs 18). In exemplary embodiment, the humps 16 have a catenary shape. A catenary shape is the curve assumed by a cord of uniform density and cross section that is perfectly flexible but not capable of being stretched that hangs freely from two fixed points. A catenary shape hump 16 allows for exact compensation of a square wheel assuming that the length of the side of the wheel corresponds to the arcuate length of the hump 16.

Figure 3A:
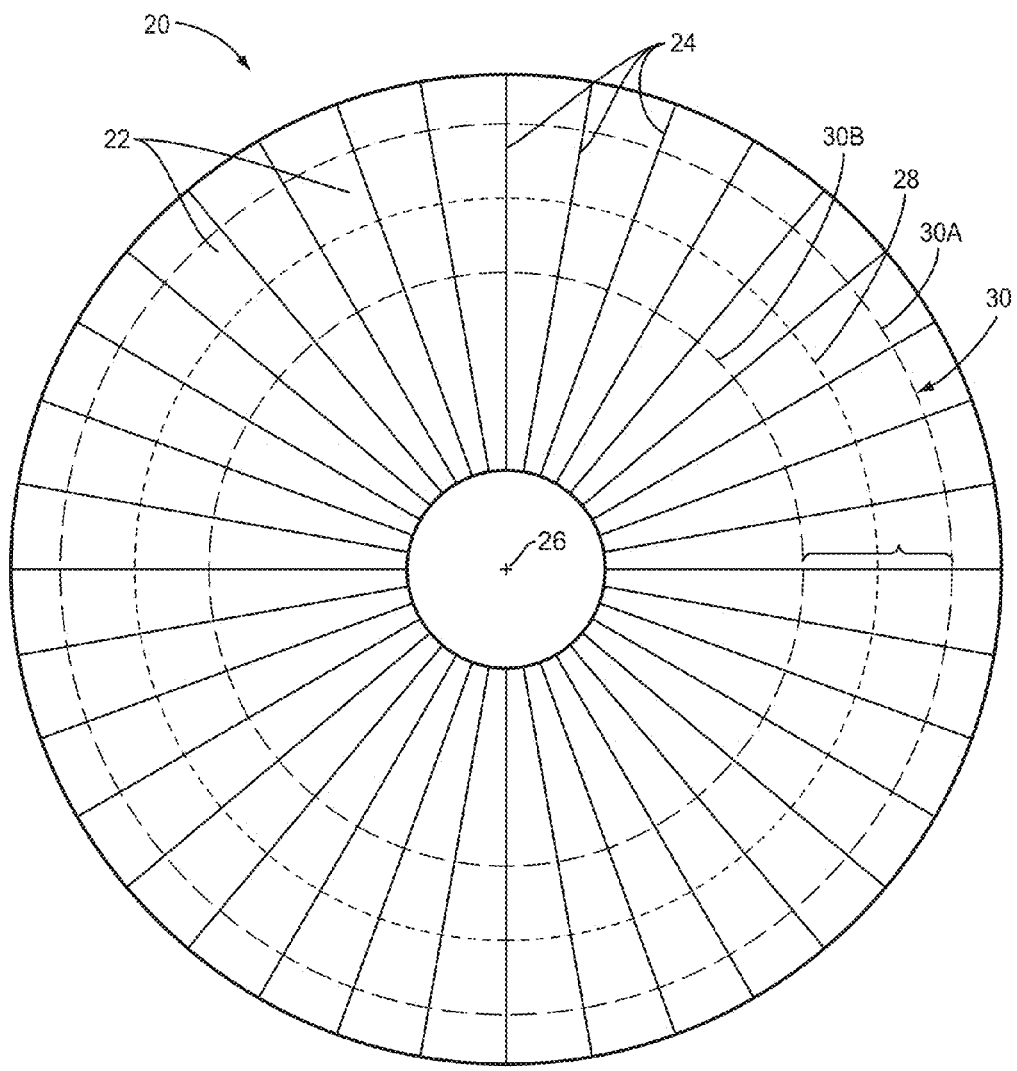
FIGS. 3A & 3B illustrate a top and side view respectively of a track suitable for use with a square wheel tricycle of the present disclosure.
Figure 3B:

FIGS. 3A & 3B illustrate an endless track 20 for use with a square wheel tricycle. In particular, the track 20 is a circular disc and has radially extending bumps 22 and troughs 24 corresponding to the humps 16 of FIG. 2. The center portion 26 may be flat (illustrated), have a decorative motif, or continue the bumps 22 and troughs 24 as desired (not illustrated). Visual indicia 28 and 30 may be painted or otherwise created on the surface of the track 20 to guide a rider on the track, and in an exemplary embodiment is a solid or dotted line painted on the disc. In particular, indicia 28 may be aligned with a central or front wheel of the tricycle and indicia 30 may be for the rear wheels of the tricycle, where indicia 30A corresponds to an outer or exterior back wheel and indicia 30B corresponds to an inner or interior back wheel. In an exemplary embodiment, the endless track 20 is sixteen feet (4.88 m) in diameter and divided into thirty-two identical segments (bumps 22). In this exemplary embodiment, the center portion 26 may be four feet (1.22 m) in diameter.

Figure 5:
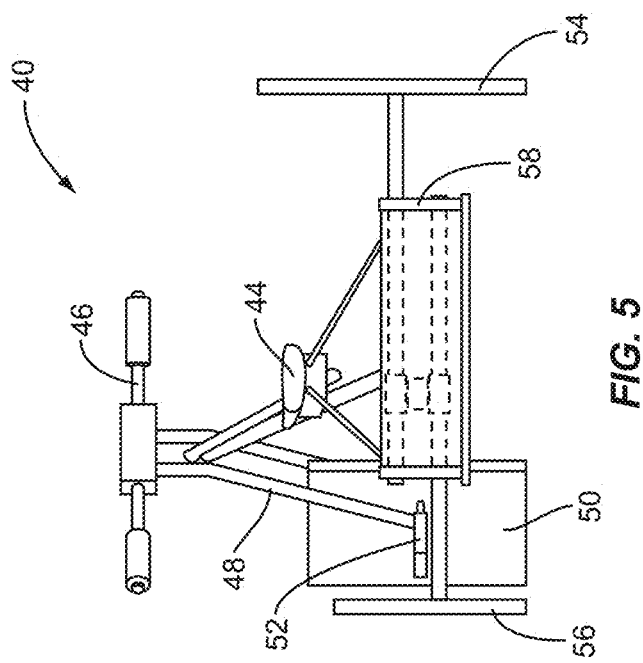
FIG. 5 illustrates a rear view of the square wheel tricycle of FIG. 4.
Figure 4:
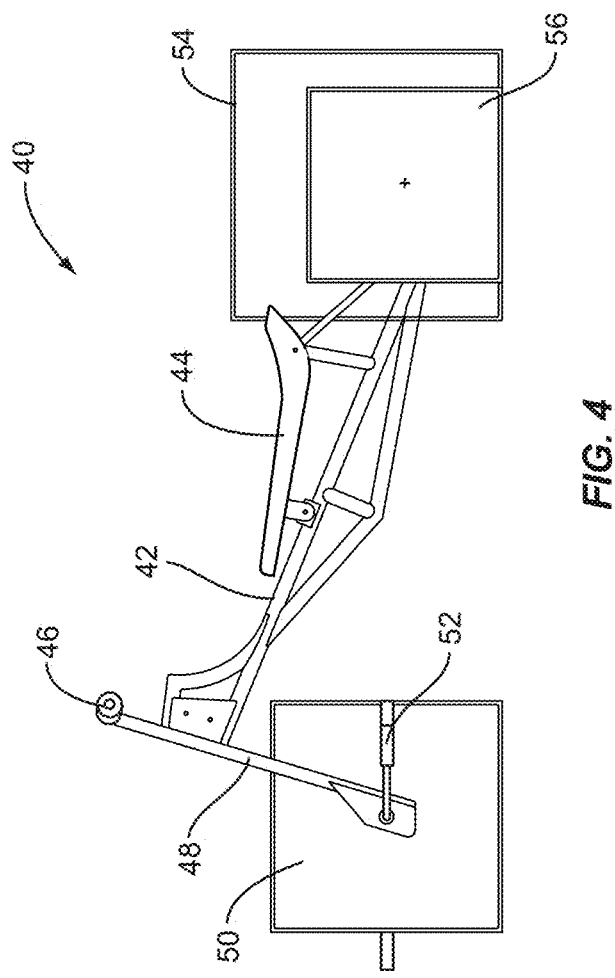
FIG. 4 illustrates an interior side view of an exemplary square wheel tricycle of the present disclosure.
Figure 6:
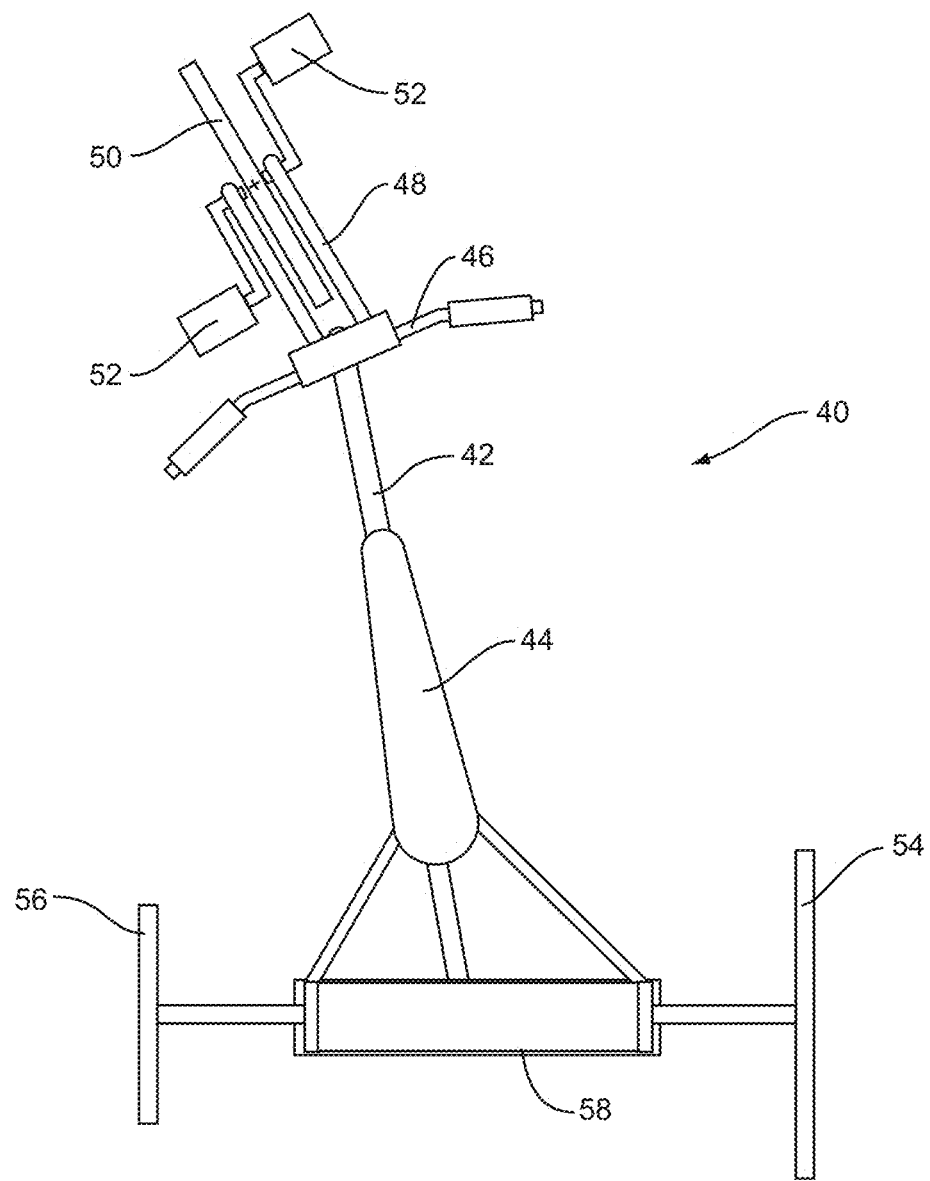
FIG. 6 illustrates a top view of the square wheel tricycle of FIG. 4.

The tricycle 40 is illustrated in FIGS. 4-6. FIG. 4 illustrates a left side view of the tricycle 40. The tricycle 40 has a frame 42, a seat 44, handles 46 and fork 48, which holds front square wheel 50 in place. Front wheel 50 is rigidly affixed to pedals 52 on either side of the front wheel 50 as is common in tricycles. When motive force is applied to the pedals 52, the front wheel 50 turns and motion is imparted to the tricycle 40. The tricycle 40 further has rear square wheels 54 and 56. Rear wheel 54 is an exterior wheel and is larger than interior rear wheel 56. The sizing differential is dictated by the nature of the endless track 20. Specifically, indicia 30A, on which exterior rear wheel 54 will rest and follow has a greater diameter, and thus a larger circumference than indicia 30B, on which interior rear wheel 56 will rest and follow. Thus, when the tricycle navigates around the endless track 20, exterior rear wheel 54 must be larger to cover the same radial sweep of movement. Rear wheels 54 and 56 are connected to one another by a gear box 58 (illustrated in FIGS. 5-7).

As better illustrated in FIG. 6, frame 42 and fork 48 are angled so that the tricycle 40 will be forced to turn as it is driven forward when motive force is applied to the pedals 52. In an exemplary embodiment, the angle of the frame 42 and the front wheel 50 are coupled to the size of the wheels and the radius of the indicia 30 on the endless track 20 so as to allow the tricycle 40 to move around the endless track 20 on the indicia 30 without requiring the operator to steer. That is, the handles 46 are locked into a fixed position, and the operator may rest her hands on the handles, but the operator is not able to change the rate of turning or the direction of travel.

In an exemplary embodiment, the overall length of the tricycle 40 is based on a span of 33.75 degrees at the radius traveled by the front wheel 50. This may be shortened or lengthened as desired. The angle between the frame 42 and the rear axle is the shortest distance between the center of the rear axle and center of the steering neck. This angle evenly divides the deflection from perpendicular at the joint between the rear axle and the frame 42, and the angle at the front wheel 50 orients the path of the front wheel 50 perpendicular to the radius of its travel. The orientation of the frame 42 places the rider's weight toward the center of the travel path, which nicely offsets the tendency of tricycles to become unstable in a direction opposite to the direction of turning. In an exemplary embodiment, the frame height is approximately 18-26 inches, depending on whether sized for a child or an adult. Variations on the frame height are within the scope of the present disclosure.

By way of example, an exemplary adult sized tricycle 40 may have a twenty-four inch (60.96 cm) offset between rear wheels 54, 56. An exemplary child sized tricycle 40 may have a twenty inch (50.8 cm) offset between rear wheels 54, 56. This offset provides reasonable stability for the tricycle 40. Likewise, in an exemplary embodiment to maintain stability, the height of the saddle (seat 44) should not greatly exceed the offset between the rear wheels.

Figure 7:
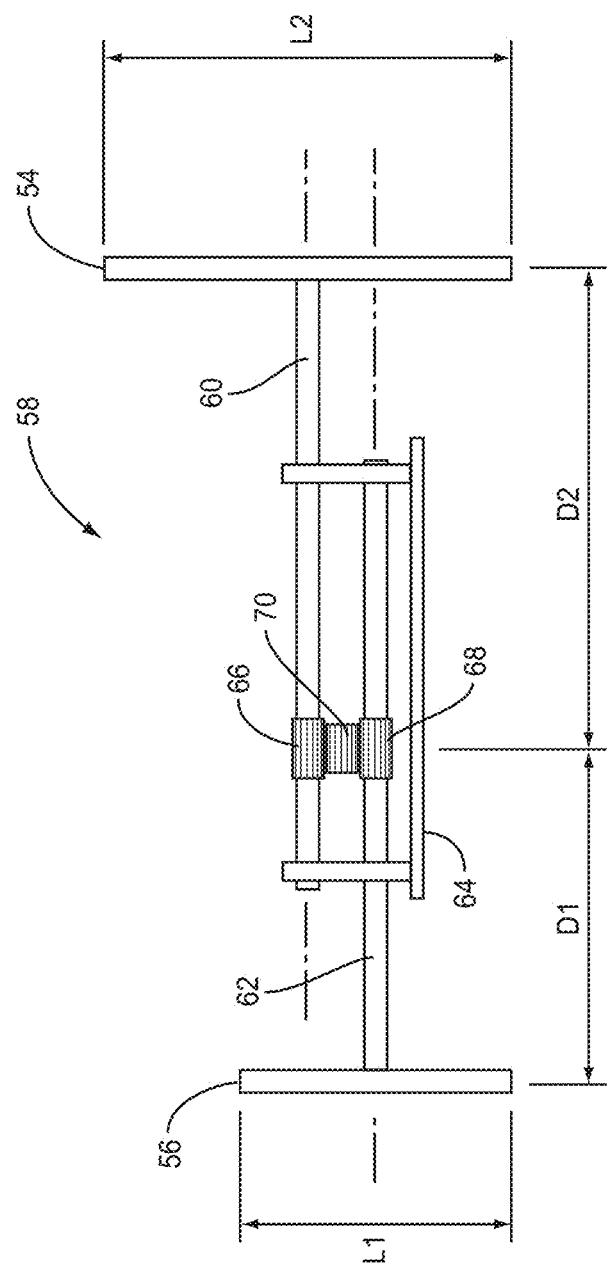
FIG. 7 illustrates a close up view of an exemplary gear mechanism for the square wheel tricycle of FIG. 4.

An exemplary gear box 58 is better illustrated in FIG. 7 and is designed to keep rear wheels 54 and 56 in a fixed relative position to one another (e.g., rotating at the same rate). To effectuate this, exterior rear wheel 54 is rigidly affixed to first shaft 60 and interior rear wheel 56 is rigidly affixed to second shaft 62. Shafts 60 and 62 pass through respective apertures (not illustrated) in gear frame 64 and freely rotate within the respective apertures. First shaft 60 has first gear 66 and second shaft 62 has second gear 68, which interoperate through third gear 70. Thus, as rear wheels 54 and 56 rotate (because someone is using the pedals 52 to drive the front wheel 50 and the front wheel 50 is turning, thereby pulling the tricycle 40 forward, causing the rear wheels to rotate), the shafts 60 and 62 rotate, which in turn causes the gears 66 and 68 to rotate. The gears 66 and 68 are kept in step with one another by the third gear 70. Forcing the wheels to rotate at the same rate helps keep the tricycle 40 at a given radius on the endless track 20. While this attribute of concurrently rotation makes for a smoother ride, other gear boxes may be used to achieve the same result.

Figure 8:
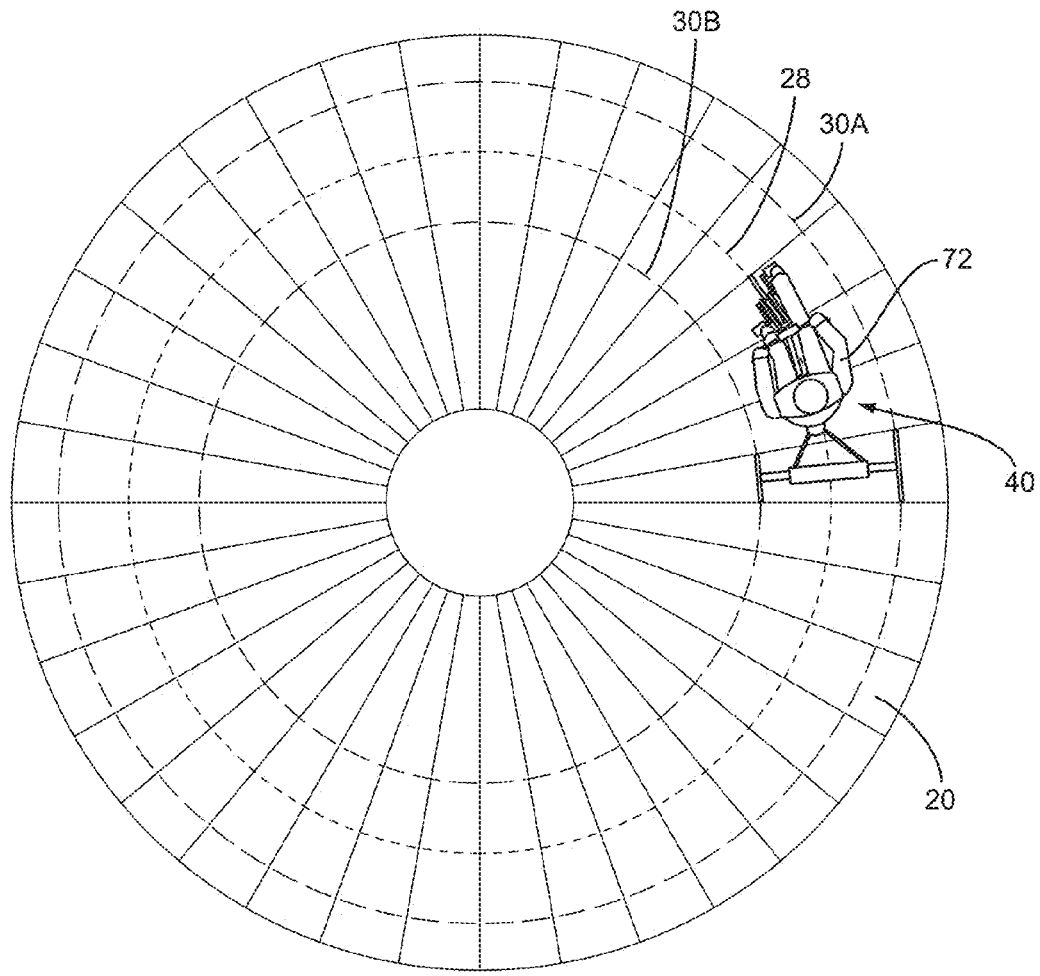
FIG. 8 illustrates the tricycle of FIG. 4 on the track of FIG. 3.

FIG. 8 illustrates and overhead shot of a person 72 riding the tricycle 40 on the endless track 20. As is illustrated, the front wheel 50 follows the visual indicia 28 and rear wheels follow indicia 30A and 30B. Given the angle of the frame 42 and the angle at which the front wheel 50 is fixed relative to the frame 42, when the person 72 pushes the pedals 52, the tricycle 40 moves around in a circle staying at a fixed radius from the center of the endless track 20. In this manner, the person 72 may continue to pedal around the circle until they grow tired of the activity. Spectators may view the motion of the square wheels and see how the square wheels interact with the bumps 22 and troughs 24 of the endless track 20. In this manner, mathematical properties are exhibited in an interactive and enjoyable fashion.

In an exemplary embodiment, visual indicia 28, 30 may be duplicated so that two tricycles 40 may operate on the endless track 20 concurrently. With a sixteen foot diameter endless track 20, it is possible to lay the visual indicia 28, 30 on the endless track in such a manner that adequate clearance between the wheels and pedals of the two tricycles is provided (e.g. approximately ten to twelve inches clearance). Likewise, such an arrangement may still provide a respectable distance (e.g., six-twelve inches) between the exterior rear wheel 54 of the larger outer tricycle and the outer edge of the endless track 20 as well as between the interior wheel 56 of the smaller inner tricycle and the center portion 25.

In an exemplary embodiment, assuming two tricycles 40 riding on the endless track 20, the wheel sizes may be as follows: 20.0494 inch per side for the exterior rear wheel 54 on the outer tricycle (operating at a 90 inch radius); 17.3761 inch per side for the front wheel 50 of the outer tricycle (operating at a 78 inch radius); 14.7029 inch per side for the interior rear wheel 56 of the outer tricycle (operating at a 66 inch radius); and 12.0296 inch per side for the exterior rear wheel 54 for the inner tricycle (operating at a 54 inch radius); 9.8019 inch per side for the front wheel 50 of the inner tricycle (operating at a 44 inch radius); and 7.5742 inch per side for the interior rear wheel 56 of the inner tricycle (operating at a 34 inch radius). The wheel sizes are dictated by the radius at which the wheels operate and conform to the following equation (given 32 bumps 22):

$$\text{Side of wheel } S = (2*\pi*r)/(32*\arcsin h \qquad (1))$$

Note that if the tricycles 40 are moved to operate at different radii or with different clearances between tricycles and/or the edges of the endless track 20, the size of the wheels will change accordingly, and such adjustments are within the scope of the present disclosure. Likewise, if the size of the endless track 20, or number of bumps 22 changes, the size of the wheels will change. Such variations are within the scope of the present disclosure.

Figure 9:
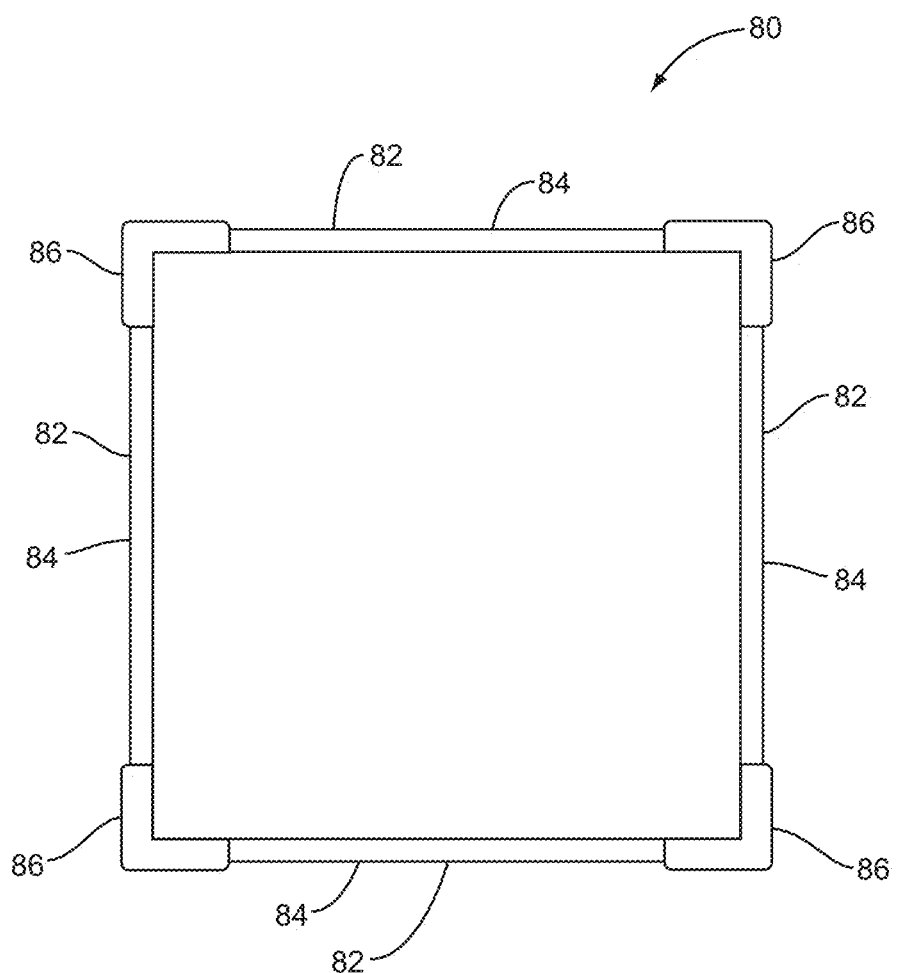
FIG. 9 illustrates a resilient member on a square wheel to cushion rotation of the square wheel.

FIG. 9 illustrates an exemplary square wheel 80, which may serve as front wheel 50 or rear wheels 54, 56. The wheel 80 is square and substantially rigid. It may be made from a solid planar material including, but not limited to metal, wood or plastic. Alternatively, the square wheel 80 may include spokes (not illustrated) as is well understood. The outer edges of the wheel 80 are cushioned by a resilient member 82, divided into long flat portions 84 and corner portions 86, and made from a material such as rubber (natural or synthetic) or foam, and which may be secured to the wheel through an adhesive or a fastener. Corner portions 86 may be thicker than long flat portions 84 to allow for the greater wear and tear that the corners experience while in use. Likewise, by making the corner portions 86 effectively modular relative to the rest of the resilient member 82, the corner portions 86 may be replaced with ease as the corner portions exhibit wear. In an exemplary embodiment, the wheels 80 are ¾ inch (1.91 cm) thick and made from a material such as HDPE. With this thickness there is approximately a ⅙ inch difference in the side length of the squares, so the squares may be beveled to function smoothly. Alternatively, the resilient member 82 may mitigate the need for such beveling.

In an alternate embodiment, not illustrated, a motor may be applied to the gear box along with a power switch and/or a throttle and the tricycle may be propelled around the track by operation of the motor rather than manual force being applied to the pedals. The motor may be electric and have an associated battery or it may be a combustion engine operating on hydrogen or a fossil fuel or the like. Instead of a manually operated power switch and throttle, there may be a computer controlled system in place, including one where the onboard computer wirelessly communicates to a remote computer and the remote computer provides instructions on the operation of the tricycle in much the same manner that a radio controlled toy car may operate. Such a computer operated system may have a control system embodied in the computer processing unit, a display and appropriate input and output devices such as a display and appropriate wireless transmission capability. The programs that operate such a computer may be stored on an appropriate computer readable medium.

In an alternate embodiment, more than one set of indicia may be placed on the endless track 20 and tricycles with appropriately sized wheels may ride on the different indicia. Indicia having a smaller radius may support a smaller tricycle, allowing small children to experience the exhibit, while indicia having a larger radius may support larger tricycles, allowing adults to experience the exhibit. In a variation on this embodiment, the tricycles may travel in different directions (clockwise and counterclockwise) around the endless track 20 as desired.

While it is contemplated that the frames of the tricycles may be made from steel, other materials may also be used such as titanium, aluminum, or the like.

In an alternate embodiment, signage may be present near the system which explains the math behind the system as well as any particular applications or instructions which may be imparted to an audience.

In an alternate embodiment, the number of wheels on the tricycle 40 may be varied. Two and four wheel permutations are readily within the scope of the present disclosure. Thus, as used herein the term bicycle includes tricycles and quad-bikes and the term tricycle includes cart or four-wheeled (quad-wheeled) bike. Such a cart is also termed a quad-bike herein.

RULES OF INTERPRETATION & GENERAL DEFINITIONS

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate)

may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present disclosure. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present disclosure.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, TCP/IP, or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

What is claimed is:

1. A system configured for use as a museum exhibit to facilitate appreciation of mathematics, the system comprising:
    a circular endless track comprising a disc having bumps and troughs having a catenary shape; and
    a tricycle comprising:
        square wheels wherein the square wheels rotate as the tricycle travels around the circular endless track, wherein the square wheels are sized to correspond to the bumps and the troughs of the circular endless track wherein the square wheels comprise an interior rear square wheel and an exterior rear square wheel;
        pedals adapted to receive motive force and pass the motive force to the square wheels to drive the tricycle around the circular endless track;
        an angled frame adapted to force the tricycle to turn in a circle when the motive force is applied to the pedals; and
        a gear box, a first axle, and a second axle, wherein the first axle is coupled to the exterior rear square wheel and the second axle is coupled to the interior rear square wheel, and the first and second axles interoperate within the gear box such that the first and second axles are at different heights.

2. The system of claim 1 wherein the tricycle comprises a front square wheel.

3. The system of claim 2 wherein the exterior rear square wheel is larger than the interior rear square wheel.

4. The system of claim 3 wherein the front square wheel is intermediately sized relative to the interior rear square wheel and the exterior rear square wheel.

5. The system of claim 1 wherein each of the square wheels comprises a resilient member attached to an outer surface of each respective square wheel.

6. The system of claim 5 wherein the resilient member comprises a long flat portion and a corner portion.

7. The system of claim 6 wherein the corner portion is adapted to be replaced without having to replace the long flat portion.

8. The system of claim 1 wherein the circular endless track further comprises two sets of visual indicia indicating lanes on the circular endless track for two tricycles to operate concurrently with one set of the visual indicia concentrically positioned inside a second set of the visual indicia.

9. The system of claim 6 wherein the circular endless track comprises indicia and the tricycle is adapted to ride around the circular endless track on the indicia.

10. The system of claim 1 wherein the gear box comprises, a first gear, a second gear, and a third gear, and the first gear and the second gear interoperate through the third gear.

11. A method of demonstrating mathematical relationships comprising:
    providing an endless track shaped like a disc with bumps and troughs having a catenary shape and indicia;
    providing a tricycle comprising an angled frame and three square wheels comprising an exterior rear square wheel, an interior rear square wheel and a front wheel, wherein the exterior rear square wheel is larger than the interior rear square wheel and the tricycle further comprises a gear box, a first axle, and a second axle, wherein the first axle is coupled to the exterior rear square wheel and the second axle is coupled to the interior rear square wheel, and the first and second axles interoperate within the gear box such that the first and second axles are at different heights;
    positioning the tricycle on the endless track such that the tricycle will travel on the indicia as the tricycle moves around the endless track; and
    allowing an operator to ride the tricycle around the endless track.

12. The method of claim 11 wherein providing the tricycle comprises providing a tricycle further comprising a first gear, a second gear, and a third gear, and the first gear and the second gear interoperate through the third gear.

13. The method of claim 11 wherein providing the endless track with the bumps and the troughs comprises providing a track with radially extending bumps and troughs.

14. A tricycle comprising:
a front square wheel comprising pedals;
a rear interior square wheel;
a rear exterior square wheel;
an angled frame adapted to force the tricycle to travel in a circle when motive force is applied to the pedals; and
a gear box, the gear box comprising a first shaft, a first gear, a second gear, a third gear, and a second shaft, and the rear exterior square wheel is rigidly affixed to the first gear through the first shaft and the rear interior square wheel is rigidly affixed to the second gear through the second shaft, and the first gear and the second gear interoperate through the third gear and the first and second shafts are at different heights.

15. The tricycle of claim 14 wherein the rear exterior square wheel is larger than the rear interior square wheel.

\* \* \* \* \*